March 25, 1958     W. BORNEMANN     2,828,001

DEVICE FOR TRANSPORTING DISCRETE ELEMENTS

Filed Feb. 14, 1956     2 Sheets-Sheet 1

WILLIAM BORNEMANN
INVENTOR

BY

ATTORNEY/AGENT

March 25, 1958      W. BORNEMANN      2,828,001

DEVICE FOR TRANSPORTING DISCRETE ELEMENTS

Filed Feb. 14, 1956      2 Sheets-Sheet 2

WILLIAM BORNEMANN
INVENTOR

BY

ATTORNEY/AGENT

United States Patent Office 2,828,001
Patented Mar. 25, 1958

2,828,001

DEVICE FOR TRANSPORTING DISCRETE ELEMENTS

William Bornemann, Rochester, N. Y., assignor to Eastman Kodak Company, Rochester, N. Y., a corporation of New Jersey Application February 14, 1956, Serial No. 565,453

6 Claims. (Cl. 198—131)

The present invention relates to a carrier for transporting discrete elements from one to the other of two fixed stations and more particularly to an arrangement of yieldable members on said carrier which will retain each discrete element thereon and which will, at the same time, permit such elements to be placed on or removed from the carrier.

It is well-known to transport elements between two stations by means of a conveyor belt or some such similar device; however, in such apparatus the linear speed is relatively low, or the weight of the element sufficiently heavy so that the problem of retaining the element on the conveyor is not a critical one. In the transporting of a small piece of film which contains lines of code as well as document images and which must be maintained relatively flat for the purpose of scanning the code, the problem of maintaining such a light element on a conveyor which is moved at a very high speed becomes very critical. Further, since such elements are placed on and removed from the conveyor by automatic means, it is essential that the retaining means on the conveyor permit both such actions to be accomplished with a minimum of moving parts and as simply as possible.

By providing a carrier of either the belt or rotary type with a plurality of spaced apertures which are of a size and configuration substantially that of the element, a plunger and vacuum system can be utilized for removing the lowermost element from the bottom of an open end hopper to deposit it on the carrier and with respect to the aperture. The plunger can also be utilized to remove the element from the carrier and to insert it in the hopper. In order to support the element with respect to the aperture, each aperture is provided with members which extend into the aperture for engaging the marginal edges of the element. The element is positioned with respect to the aperture by means of extensions which are spaced and arranged along each edge of the aperture and which extend in a direction normal to the surface of the carrier. On opposite sides of the aperture, each of the extensions is relieved for a portion of its length to provide a flexible member which is yieldable in a plane parallel to that of the carrier, the end of such extension being formed over into a cylindrical portion which overlies the aperture and the element when it is positioned on the carrier with respect to the aperture for retaining said element in position. Since the retaining portion is yieldable, the plunger or the film, depending on whether the element is being placed on the carrier or removed therefrom, will flex the member outwardly to permit the element to be moved thereby. The plunger is capable of placing on or removing from the carrier such elements at the rate of 15 to 30 per second and the carrier must be moved intermittently at a corresponding speed and with great accuracy in order to insure proper alignment of the aperture with respect to the hopper from which the elements are withdrawn or inserted. It has been found that the disclosed arrangement provides a very efficient and satisfactory arrangement for retaining such light elements on a carrier moved at such high intermittent speed.

The primary object of the invention is, therefore, to provide a carrier for moving discrete elements at a high rate of speed and on which such elements are retained in proper relation to an aperture therein.

Another object of the invention is to provide a carrier having a plurality of spaced apertures over which an element is retained in proper relation thereto during movement of said carrier.

Yet another object of the invention is to provide a carrier having a plurality of spaced apertures over which an element is retained in proper relation thereto by yieldable members which permit said elements to be placed on and removed from the carrier when said carrier is stationary.

And still another object of the invention is to provide a carrier having a plurality of spaced apertures over which an element is retained in proper relation thereto by members supporting the element along its marginal edges and in the plane of the carrier, by members along the edges of the aperture which locate the element both laterally and transversely and by yieldable members which permit the element to be placed on or removed from the carrier when said carrier is stationary and which hold or retain the element during movement of the carrier.

Other objects and advantages of the invention will be disclosed to those skilled in the art by the description which follows.

Reference is now made to the accompanying drawings in which lke reference numerals designate like parts and wherein.

Figure 1:
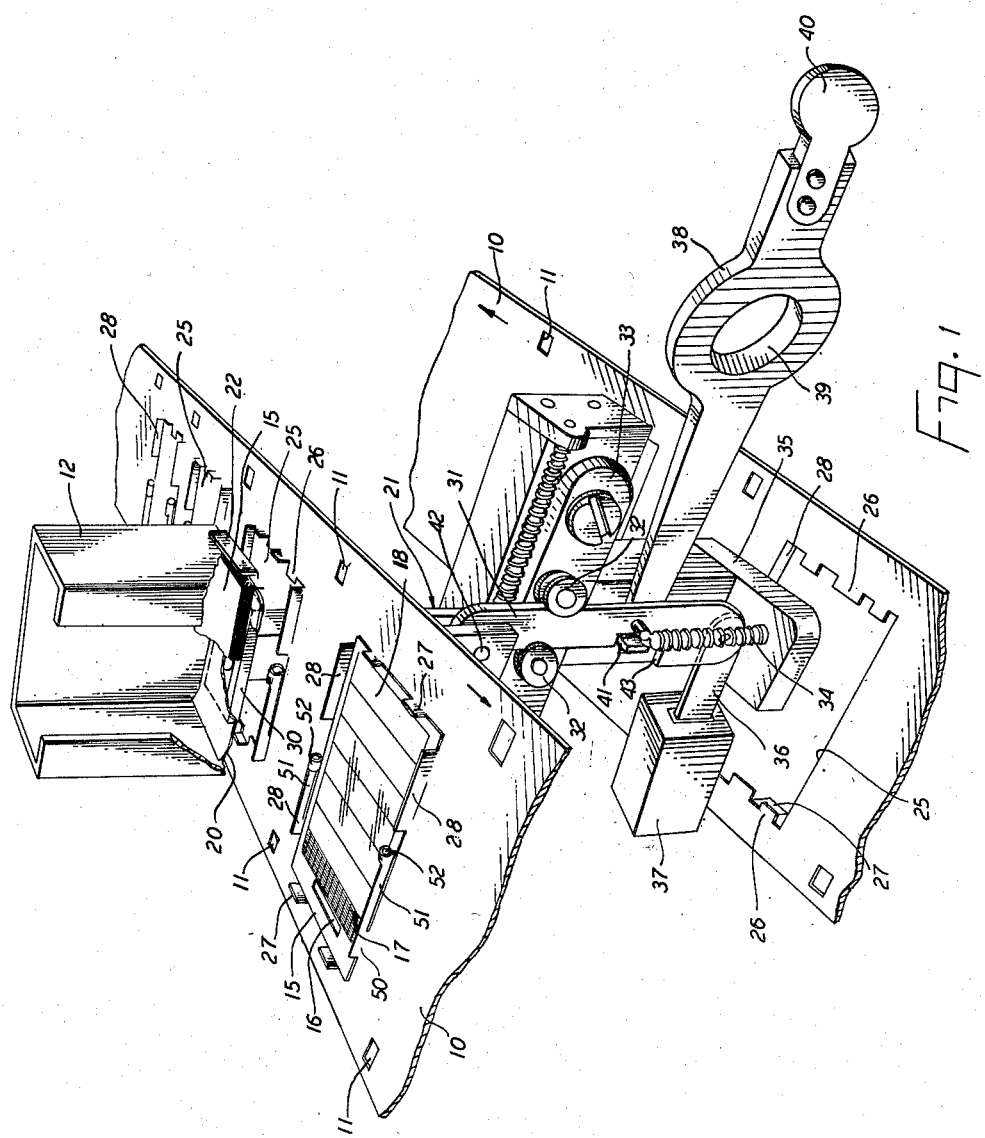
Fig. 1 is a perspective view of a carrier in accordance with the invention and showing the relation of said carrier to one of the hoppers and the mechanism for inserting and removing the elements into and from the hopper.
Figure 2:
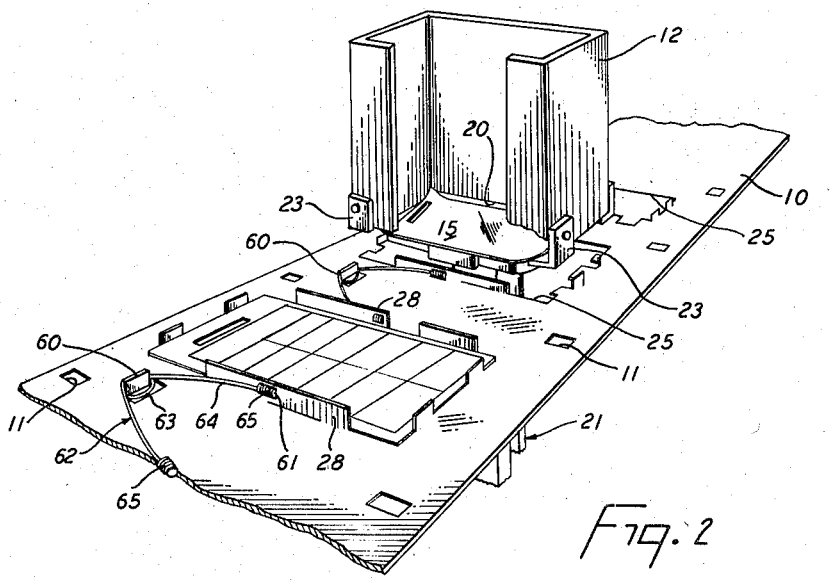
Fig. 2 is a perspective view similar to that of Fig. 1 and showing another embodiment of the means for retaining each element on the carrier and in position over its respective aperture.

With reference to Fig. 1 of the drawing, carrier 10 is disclosed as an endless belt, preferably of metal, which is provided along its marginal edges with spaced perforations 11 for engaging the teeth of spaced driving sprockets, not shown, in a conventional and well-known manner, one of said sprockets being driven intermittently by means of a well-known Geneva movement. Carrier 10 is arranged beneath a plurality of open-end hoppers or magazines 12, only one of which is shown in Figs. 1 and 2, and serves to transport the elements 15 which are stacked in one of hoppers 12 to another one of said hoppers spaced therefrom. While in the embodiment of the invention disclosed the carrier 10 is shown as a member movable in a straight path for transporting an element from one hopper to another, carrier 10 can also be of a rotary type in which the elements are moved in a curved path from one hopper to another, the invention being applicable in either instance.

Elements 15 comprise small pieces of film substantially five-eighths of an inch wide and one and one-quarter inches long, each element having a transverse aperture 16 adjacent one end thereof, a code area 17 in which a plurality of lines of code have been exposed transversely thereof, and an image area 18 in which a plurality of document images have been exposed both transversely and longitudinally thereof. The lines of code in area 17 are related to the information contained in the document imaged in area 18 and are utilized to locate such document images as well as to sort and/or collate the elements in accordance with code information thereon. It is in connection with various apparatus for sorting selecting, collating and duplicating the information appearing on such elements that carrier 10 is utilized for transporting the discrete elements.

Hoppers 12 are open at each end which permits elements 15 to be stacked therein from the upper end and which permits said elements to be withdrawn from and/or inserted into the lower open end 20 adjacent carrier 10 by reciprocating means 21, as will be described in detail hereinafter. Open end 20 is provided along two opposite edges, as shown in Fig. 1, with lips 22, or at each corner, as shown in Fig. 2, with lips 23 which serve to support the stack of elements therein.

Carrier 10 is provided with a plurality of spaced apertures 25, the apertures being arranged therealong so that with each intermittent movement of carrier 10, an aperture 25 is aligned with the hopper arranged thereover. Each of apertures 25 is provided with spaced portions 26 extending into aperture 25 along at least two opposite edges thereof for supporting the element 15 with respect to said aperture. Vertically extending members 27 which are normal to the surface of carrier 10 are spaced along the same edges of apertures 25 as portions 26 and vertically extending and spaced members 28 are provided along the adjacent edges, as shown in Fig. 1.

In sorting apparatus which utilizes the structure described, carrier 10 is moved beneath a series of hoppers 12 on each side of a reading station, not shown. On one side of the reading station, a hopper is loaded with a stack of elements and by means of a reciprocating means 21, which is arranged beneath each hopper and which is plugged for intermittent operation in synchronism with carrier 10, the lowermost element in the loaded hopper is withdrawn during the interval carrier 10 is stationary and deposited on said carrier and with respect to the aperture 25 aligned with the hopper. With the intermittent movement of the carrier 10 and reciprocating means 21, elements 15 are successively withdrawn and placed on carrier 10, moved intermittently through the reading station where the code is read, and in accordance with the code are then inserted into one of the hoppers on the other side of the reading station by a similar reciprocating means. The reciprocating means on the other side of the reading station are controlled by a memory device associated with the reading station for placing each element 15 in its respective hopper.

Reciprocating means 21 comprises a plunger 30, which is guided in suitable bearings and secured to link 31 which is slidable in a vertical direction between rollers 32 carried by plate 33. Spring 34, which is fixed to link 31 and bracket 35, retains link 31 and plunger 30 in a fully withdrawn position. Link 31 is maintained in a position to the right by the spring biased armature 36 of solenoid 37. Arm 38, which is pivotally mounted at 39 to a suitable bracket or plate, carries a cam follower 40 on one end of said arm and has a formed over lug 41 on the other end thereof. The cam, not shown, for oscillating arm 38 is continuously rotated and is synchronized with the movement of carrier 10 so that arm 38 is actuated only during the interval carrier 10 is stationary. However, lug 41 is free of link 31 until solenoid 37 is energized at which time armature 36 moves link 31 to the left about its pivot 42 whereby notch 43 on link 31 is engaged by lug 41 and said link 31 and plunger 30 are moved through aperture 25 in carrier 10. If reciprocating means 21 is withdrawing elements successively from its associated hopper 12, solenoid 37 is energized continuously and link 31 and arm 38 are retained in an engaged relation. When reciprocating means 21 is to insert an element into its respective hopper, solenoid 37 will be energized in proper timed relation by a memory device associated with the reading station, the time interval between reading any one element and its being placed in the designated hopper depending on the location of the recipient hopper with respect to the reading station.

Plunger 30 has associated therewith a vacuum system, not shown, which aids in withdrawing the lowermost element from the supply hopper and which is operative only when elements are being withdrawn. When elements 15 are being withdrawn, plunger 30 is moved against the lowermost element and the vacuum serves to draw and retain the element against the plunger. Lips 22, or lips 23, which support the stack of elements in the hopper, cause the element being withdrawn to flex and separate itself from the next element. When the element is flexed past said lips, it is deposited on the carrier and extending portions 26 support the element over aperture 25, the vacuum system being rendered inoperative with the engagement of the element by portions 26.

Since the intermittent movement of plunger 30 and carrier 10 is at a very high rate of speed, it is necessary to provide means for retaining said elements in proper relation over their respective aperture 25. This is accomplished, as shown in Fig. 1, by forming one of members 28 on opposite sides of aperture 25 into a retaining member. These members comprise a portion 50 which is integral with carrier 10 and serves to locate the element, an arm 51 which is resilient and extends parallel to the edge of aperture 25 and a cylindrically formed end 52 which overlies aperture 25 and serves to hold and retain the element over said aperture. While end 52 overlies aperture 25, arm 51 permits plunger 30 to flex said arm sideways and out of the path of said plunger as it is moved toward the hopper and also as said plunger moves in the opposite direction. Due to the resilient nature of arm 51, however, it returns end 52 to its original position over aperture 25. If an element is placed over the aperture, end 52 prevents fluttering or movement of said element as carrier 10 is moved. The flexing action of arm 51 is such that the movement of an element by plunger 30 toward the hopper will cam end 52 out of its path to permit said element to be moved toward and inserted into the hopper.

Figures 3, 4:
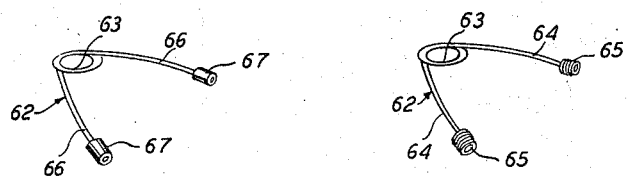
Fig. 3 is a detail perspective view of the retaining member utilized in Fig. 2.
Fig. 4 is a detail perspective view of another form of retaining member similar to that shown in Fig. 3.

In another embodiment of the invention carrier 10 is provided with a formed-up lug 60 between each aperture, as shown in Fig. 2, and each of members 28 on opposite sides of aperture 25 are provided with an opening 61. A resilient member 62 having a central mounting portion 63, extending arms 64 and formed-coil ends 65 is mounted on carrier 10 with the central portion 61 retained on carrier 10 by lug 60 and with ends 65 extending into openings 61 in adjacent members 28. The ends 65 of each resilient member 62 overlie adjacent apertures 25 and function in exactly the same manner as ends 52 when engaged by either plunger 30 or element 15. In Fig. 4 another embodiment of resilient member 62 is disclosed in which each of arms 66 have a roller 67 rotatably mounted thereon. Rollers 67 are preferably of a plastic material, such as nylon, or any other material having a low coefficient of friction and extend into openings 61 and overlie aperture 25 in the same manner as ends 52 or 65.

As a result of the structure described above, carrier 10 is provided with suitable means for retaining elements 15 over their respective apertures in a manner which permits very rapid movement of said carrier without any fluttering or movement of the elements, which maintains the elements in position for accurate scanning as they are moved into and through a reading station, and which permits the elements to be placed on or removed from the carrier by suitable reciprocating means movable through the apertures in the carrier. Since other modifications of the invention will be apparent to those skilled in the art, the invention is not to be limited to the embodiments disclosed but is defined by the appended claims.

Having now particularly described my invention, what I desire to secure by Letters Patent of the United States and what I claim is:

1. In a device for transporting a discrete element from one to the other of two fixed and spaced stations, the combination comprising a carrier provided with an aperture of substantially the same size and configuration as said element for moving said element between said stations, means on said carrier extending into and spaced along opposite edges of said aperture for supporting said element over said aperture, means on said carrier spaced about the edges of said aperture and extending in a plane normal to the plane of said supporting means for locating said element with respect to said aperture, and yieldable means on said carrier adjacent opposite edges of said aperture and having portions overlying said element, when said element is positioned over said aperture, for retaining said element on said carrier.

2. In a device for transporting a discrete element from one to the other of two fixed and spaced stations, the combination comprising a carrier provided with an aperture of substantially the same size and configuration as said element for moving said element between said stations, a plurality of members on said carrier extending into and spaced along opposite edges of said aperture for supporting said element over said aperture, a plurality of members on said carrier spaced about the edges of said aperture and extending in a direction normal to the plane of said supporting members for locating said element with respect to said aperture, and yieldable members on said carrier arranged adjacent opposite edges of said aperture and having the ends thereof overlying said element, when said element is positioned over said aperture, for retaining said element on said carrier.

3. In a device for transporting discrete elements from one to the other of two fixed and spaced stations, the combination comprising a carrier provided with a plurality of spaced apertures of substantially the same size and configuration as said elements for moving said elements between said stations, a plurality of members on said carrier extending into and spaced along opposite edges of each of said apertures for supporting an element thereover, a plurality of members on said carrier spaced about the edges of each of said apertures and extending in a direction normal to the surface of said carrier for locating said element with respect to said aperture, and resilient means on said carrier arranged adjacent opposite edges of each of said apertures and having portions overlying the element, when the element is positioned over one of said apertures, for retaining said elements on said carrier.

4. In a device for transporting discrete elements from one to the other of two fixed and spaced stations, the combination comprising a carrier provided with a plurality of spaced apertures of substantially the same size and configuration as said elements for moving said elements between said stations, a plurality of members on said carrier extending into and spaced along opposite edges of each of said apertures for supporting an element thereover, and a plurality of members on said carrier arranged in spaced relation along each edge of each of said apertures and extending in a direction normal to the surface of said carrier for locating said elements, when on said carrier, with respect to said apertures, one of said locating members on opposite sides of each of said apertures comprising a locating portion, an extension yieldable in a plane parallel to the surface of said carrier and an end overlying said aperture and the element positioned thereover for retaining said element on said carrier.

5. In a device for transporting discrete elements from one to the other of two fixed and spaced stations, the combination comprising a carrier provided with a plurality of spaced apertures of substantially the same size and configuration as said elements for moving said elements between said stations, a plurality of members on said carrier extending into and spaced along opposite edges of each of said apertures for supporting an element thereover, a plurality of members on said carrier arranged in spaced relation along each edge of each of said apertures and extending in a direction normal to the surface of said carrier for locating said elements, when on said carrier, with respect to said apertures, one of said locating members on opposite sides of each of said apertures being provided with an opening above the plane of said elements when said elements are positioned over said apertures, and resilient members mounted on said carrier and between said apertures, each member having two ends yieldable in a plane parallel to the plane of the carrier and insertable in said openings of adjacent locating members, said ends projecting through said openings and overlying said elements, for retaining said elements on said carrier.

6. In a device for transporting discrete elements from one to the other of two fixed and spaced stations, the combination comprising a carrier provided with a plurality of spaced apertures of substantially the same size and configuration as said elements for moving said elements between said stations, a plurality of members on said carrier extending into and spaced along opposite edges of each of said apertures for supporting an element thereover, a plurality of members on said carrier arranged in spaced relation along each edge of each of said apertures and extending in a direction normal to the surface of said carrier for locating said elements, when on said carrier, with respect to said apertures, one of said locating members on opposite sides of each of said apertures being provided with an opening above the plane of said elements when said elements are positioned over said aperture, and resilient members mounted on said carrier and between said apertures, each member comprising two ends yieldable in a plane parallel to the plane of said carrier and toward adjacent locating members of successive apertures and a roller rotatably mounted on each of said ends, said rollers extending through the openings in adjacent locating members of successive apertures and overlying said elements, for retaining said elements on said carrier.

References Cited in the file of this patent

UNITED STATES PATENTS

| | | |
|---|---|---|
| 770,696 | Peters et al. | Sept. 20, 1904 |
| 1,934,250 | Wynne et al. | Nov. 7, 1933 |
| 2,335,064 | Kabel | Nov. 23, 1943 |
| 2,524,417 | Bamber | Oct. 3, 1950 |
| 2,697,507 | Vergobbi | Dec. 21, 1954 |